(12) United States Patent
Khandelwal et al.

(10) Patent No.: US 10,769,058 B1
(45) Date of Patent: Sep. 8, 2020

(54) GENERIC SERVERLESS PERFORMANCE TESTING FRAMEWORK

(71) Applicant: Capital One Services, LLC, McLean, VA (US)

(72) Inventors: Pradeep Khandelwal, Vienna, VA (US); Syed Mehmood, Herndon, VA (US); Ashish Kumar, McLean, VA (US); Ajay Gorre, Aldie, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/427,021

(22) Filed: May 30, 2019

(51) Int. Cl.
*G06F 11/36* (2006.01)
*G06F 9/54* (2006.01)
*G06F 21/31* (2013.01)

(52) U.S. Cl.
CPC ........... *G06F 11/3692* (2013.01); *G06F 9/54* (2013.01); *G06F 11/3664* (2013.01); *G06F 11/3688* (2013.01); *G06F 21/31* (2013.01)

(58) Field of Classification Search
CPC .... G06F 9/54; G06F 11/3664; G06F 11/3688; G06F 11/3692; G06F 21/31
USPC .................................. 717/124–135
See application file for complete search history.

(56) References Cited

U.S. PATENT DOCUMENTS

| | | | | |
|---|---|---|---|---|
| 9,043,759 B1* | 5/2015 | Lininger | ............ | G06F 11/3684 717/106 |
| 9,280,442 B1* | 3/2016 | Nicolo | ................ | G06F 11/3604 |
| 10,425,292 B1* | 9/2019 | Biran | ...................... | H04L 41/28 |
| 2004/0153774 A1* | 8/2004 | Gavish | ................ | G06F 11/2273 714/25 |
| 2005/0187930 A1* | 8/2005 | Subramanian | ...... | G06F 11/3636 |
| 2011/0197176 A1* | 8/2011 | Muharsky | ........... | G06F 11/3672 717/113 |
| 2012/0017165 A1* | 1/2012 | Gardner | ................ | G06F 16/957 715/771 |
| 2015/0278076 A1* | 10/2015 | Bs | ........................ | G06F 11/3664 714/38.1 |
| 2015/0347282 A1* | 12/2015 | Wingfors | ............ | G06F 11/3688 717/125 |
| 2015/0356001 A1* | 12/2015 | Murugesan | ......... | G06F 11/3688 717/124 |
| 2016/0140015 A1* | 5/2016 | Baars | .................. | G06F 11/3608 717/132 |
| 2016/0188445 A1* | 6/2016 | Hermeto | ............. | H04L 41/5038 714/38.1 |
| 2017/0097882 A1* | 4/2017 | Chakraborty | ....... | G06F 11/3688 |
| 2018/0081793 A1 | 3/2018 | Yi | | |
| 2018/0095869 A1* | 4/2018 | Peer | .................... | G06F 11/3688 |
| 2018/0113791 A1* | 4/2018 | Fink | ...................... | G06F 11/362 |

(Continued)

*Primary Examiner* — Qing Chen

(57) ABSTRACT

Techniques for serverless performance testing of applications are provided. A user can indicate an application to test within a serverless computing framework. The user can specify parameters for testing the application. A performance test execution file can be generated based on the indicated application and the specified testing parameters. Serverless functions for implementing the testing of the application can be generated based on the performance test execution file. The serverless functions can be executed to implement the testing of the application code on a cloud-based computing resource. Test outputs can be generated and stored for review and analysis in real-time during the testing and after the testing is concluded.

12 Claims, 6 Drawing Sheets

(56) References Cited

U.S. PATENT DOCUMENTS

| | | | |
|---|---|---|---|
| 2018/0285246 A1 | 10/2018 | Tuttle et al. | |
| 2019/0007458 A1* | 1/2019 | Shulman | H04L 63/1433 |
| 2019/0065238 A1* | 2/2019 | Ling | G06F 9/547 |
| 2019/0079750 A1* | 3/2019 | Foskett | G06F 8/71 |
| 2019/0138282 A1* | 5/2019 | Keller | G06Q 10/067 |
| 2019/0205184 A1* | 7/2019 | Zhang | G06F 9/5083 |
| 2019/0205186 A1* | 7/2019 | Zhang | G06F 9/542 |

\* cited by examiner

Storage Medium 400

Computer Executable Instructions for 200

GENERIC SERVERLESS PERFORMANCE TESTING FRAMEWORK

TECHNICAL FIELD

Embodiments described herein generally relate to performance testing of applications.

BACKGROUND

Conventional techniques for performance testing of applications involve complex processes for setting up the testing that typically require complex manual configuration. As such, these conventional techniques for performance testing are time-consuming, not user-friendly, and error-prone. Further, analysis and reporting of testing results is generally tedious, non-intuitive, and time-consuming. Accordingly, what is needed is an integrated approach to performance testing that is user-friendly and robust.

SUMMARY OF THE DISCLOSURE

This disclosure presents various systems, components, and methods related to providing performance testing of applications. Each of the systems, components, and methods disclosed herein provides one or more advantages over conventional systems, components, and methods.

Various embodiments provide techniques for serverless performance testing of applications. A user can indicate an application to test within a serverless computing framework. The user can specify parameters for testing the application. A performance test execution file can be generated based on the indicated application and the specified testing parameters. Serverless functions for implementing the testing of the application can be generated based on the performance test execution file. The serverless functions can be executed to implement the testing of the application code on a cloud-based computing resource. Test outputs can be generated and stored for review and analysis in real-time during the testing and after the testing is concluded.

Serverless performance testing of applications as described herein can provide a complete cloud-based performance testing solution. The serverless performance testing of applications as described provides a cost effective and generic solution that can be integrated within development pipelines. Additionally, the serverless performance testing of applications can be provided in a self-service format that is user-friendly and can be used by non-technical individuals who want to test an application. Other embodiments are also disclosed and described.

BRIEF DESCRIPTION OF THE DRAWINGS

FIG. 4 illustrates a storage medium.

DETAILED DESCRIPTION

Figure 1:
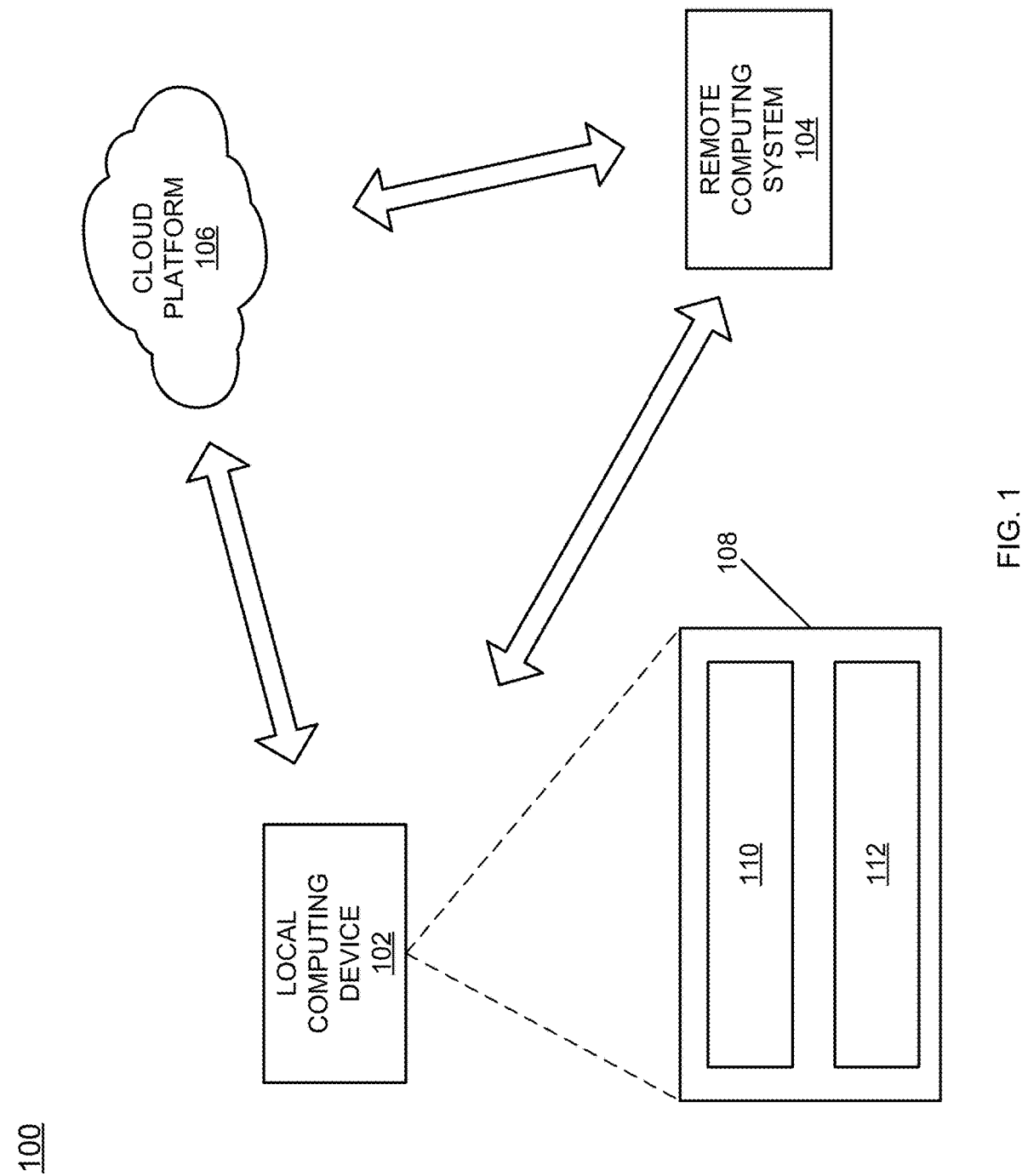
FIG. 1 illustrates an operating environment.

FIG. 1 illustrates an operating environment 100 such as may be representative of various embodiments in which techniques for serverless performance testing of applications are provided. The operating environment 100 can include a local computing device 102, a remote computing system 104, and a cloud platform 106.

The local computing device 102 can be any type of electronic computing device such as, for example, a desktop, a laptop, a tablet, a notebook, or a mobile device. The local computing device 102 can be operated by a user (not shown in FIG. 1 for simplicity).

The remote computing system 104 can be any type of computing device including a server or can represent a computer network, a cloud-based computing system, a database, or any other computer networking component, electronic computing device, and/or storage device.

The cloud platform 106 can be any type of cloud computing service, cloud management system, and/or cloud-based hardware and/or software infrastructure. The local computing device 102, the remote computing system 104, and the cloud platform 106 can be communicatively coupled such that any type of data or information can be shared among the local computing device 102, the remote computing system 104, and the cloud platform 106 over any type of communications network. Each of the local computing device 102, the remote computing system 104, and the cloud platform 106 may be communicatively coupled to any number of other local and/or remote devices, systems, or networks.

In various embodiments, a user or developer may desire to performance test code and/or an application executed by and/or provided by the remote computer system 104 (e.g., operating as a server). In many instances, performance testing of any code, software, or application (hereinafter collectively referred to as an application for simplicity without intent to be limiting) provided by the remote computing system 104 can be disruptive. For example, in many instances, performance testing of the application may require the remote computer system 104 to be offline, thereby not allowing the application to be provided to other users during the performance testing.

Techniques disclosed herein mitigate such disruptions by enabling serverless performance testing of the application. In various embodiments, the user of the local computing device 102 can conduct performance testing of any application (e.g., new and/or modified code for the application) using the cloud platform 106 (e.g., in a serverless computing framework) such that disruptions to the remote computing system 104 are minimized or do not occur as described further herein. The performance testing can be conducted through interaction with the local computing device 102.

In various embodiments, during and/or after conducting the performance testing, the local computing device 102 can provide results of the performance testing on a display 108 of the local computing device 102. The display 108 can provide any type of information or data related to the performance testing. The display 108 may provide the results as textual data or information 110 and/or as graphical data or information 112 as described further herein.

Figure 2:
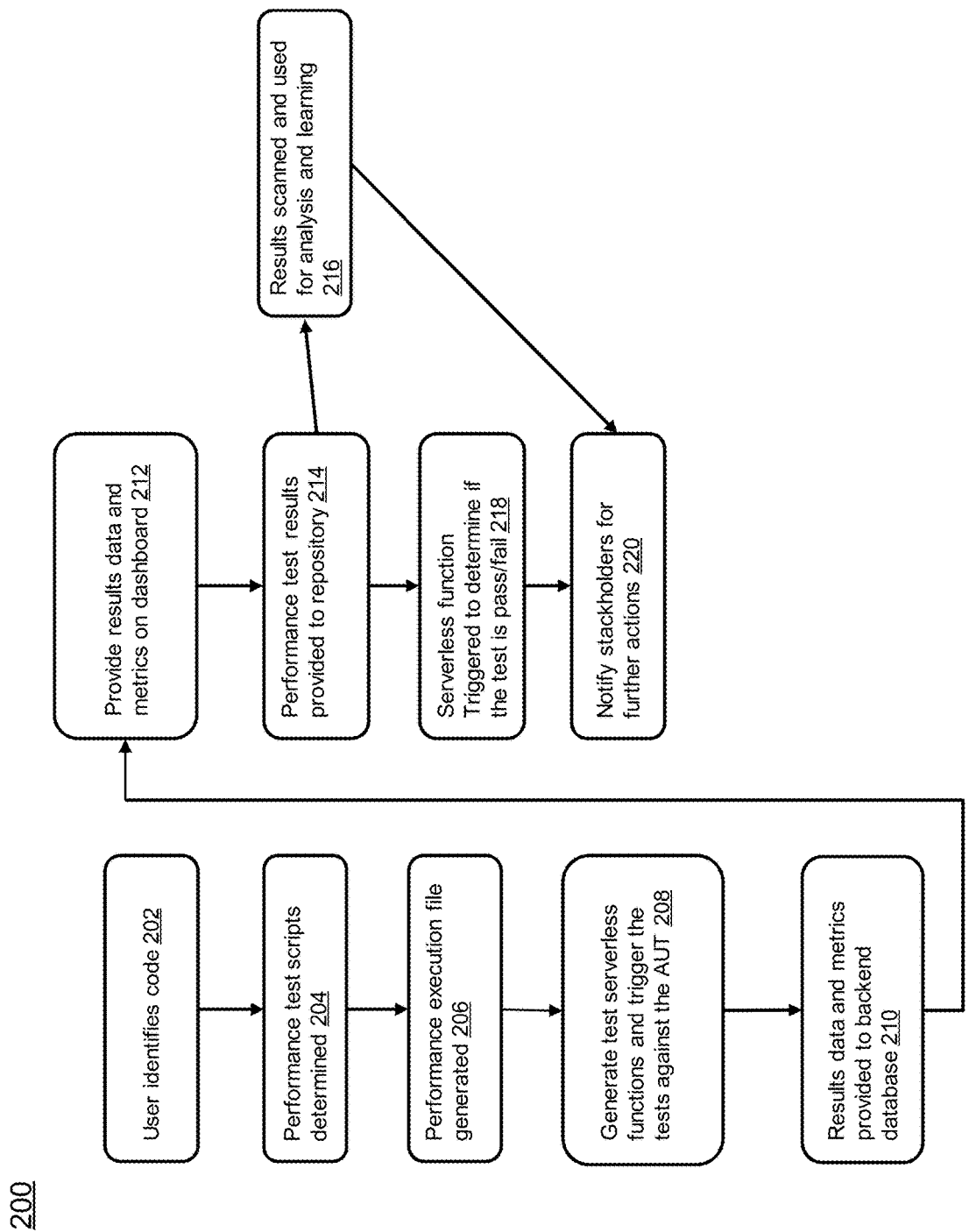
FIG. 2 illustrates a logic flow.

FIG. 2 illustrates an example of a logic flow 200 that may be representative of techniques for providing serverless performance testing of applications. For example, the logic flow 200 may be representative of operations that may be performed in various embodiments by one or more of the constituent components of the operating environment 100 depicted in FIG. 1.

At 202, a user (e.g., the user of the local computing device 102) can identify code for an application to be tested or evaluated.

At 204, one or more performance tests (e.g., test scripts) can be determined and/or generated. The performance tests can be determined based on one or more inputs from the user—for example, based on inputs from the user specifying or indicating a type of test to conduct, a duration of any test, and/or a number of users to simulate in association with the testing.

At 206, a performance testing execution file can be generated. The performance testing execution file can be generated based on the identified code and/or the determined performance tests.

At 208, based on the performance testing execution file, a number of performance test serverless functions can be determined and assigned for implementation. At 208, the performance test serverless functions can be triggered for test against the identified code and/or the application under test (AUT).

At 210, during and/or at the conclusion of testing, the performance test serverless functions can send one or more testing metrics (e.g., response time) and any data related thereto to a database or other storage device.

At 212, during (e.g., in real-time as the testing is conducted) and/or at the conclusion of the testing, one or more of the testing metrics and any data related thereto can be displayed on a testing dashboard (e.g., on a user interface provided by the local computing device 102 and/or the display 108). The testing dashboard and any metrics/data provided by the dashboard can be generated based on information stored at 210 (e.g., by querying the database storing the relevant information). In various embodiments, metrics and any data related thereto can be displayed in real-time on the display 108 by querying the database storing data related to the performance testing.

At 214, any results related to the performance testing can be transmitted for storage by a repository (e.g., any type of computer related storage device).

At 216, any of the results stored in the repository can be scanned and/or reviewed for analysis. In various embodiments, one or more machine learning algorithms, techniques, and/or applications can be used to review the results of the performance testing.

At 218, at least one performance test serverless function is triggered to evaluate any of the results of the performance testing to determine if the AUT passed or failed.

At 220, a notification can be transmitted to one or more individuals associated with the AUT—for example, developers who are desirous of testing code for the AUT (or a developer that initiated the logic flow 200). The notification can be automatically generated and transmitted based on completion of a performance test serverless function that is triggered to determine if the AUT passed or failed the performance testing and/or to determine the testing is completed. In various embodiments, the notification can be transmitted as an email to one or more individuals. As shown in FIG. 2, results of any machine learning analysis conducted at 216 may also be provided at 220.

In various embodiments, one or more of the performance test serverless functions can be implemented by the cloud platform 106. In various embodiments, one or more of the performance test serverless functions can be implemented without disrupting operation of the remote computing system 104 and/or without any testing being conducted on or by the remote computing system 104. In various embodiments, a user can initiate the testing through a web portal interface with the testing conducted on a scalable cloud computing resource.

Figure 3:
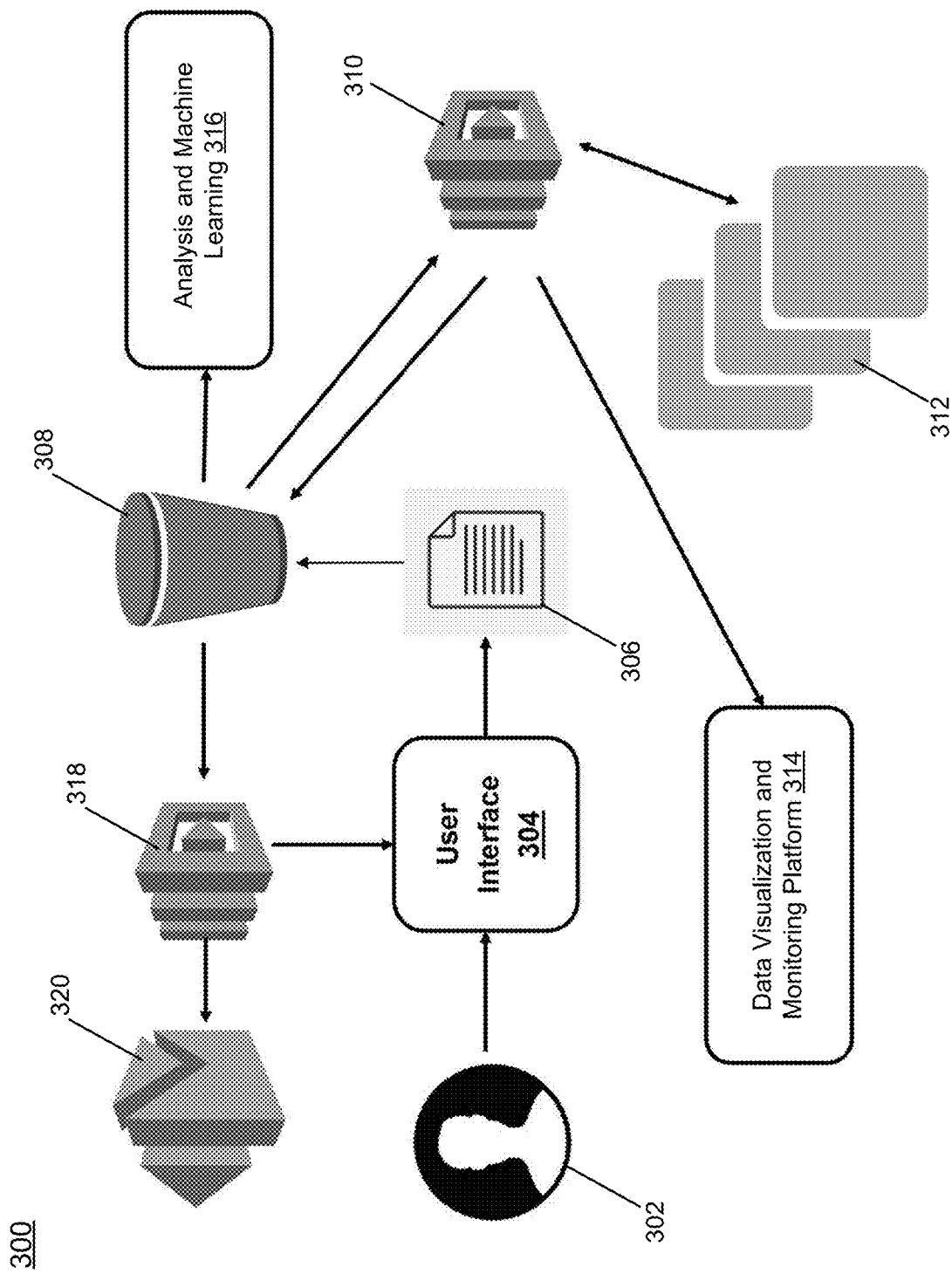
FIG. 3 illustrates a computer network architecture.

FIG. 3 illustrates an architecture 300 (e.g., an event-driven serverless architecture or framework) such as may be representative of various embodiments for providing serverless performance testing of applications. In various embodiments, the architecture 300 can include one or more components of the operating environment 100 depicted in FIG. 1 and/or can be used to implement the logic flow 200 depicted in FIG. 2.

As shown in FIG. 3, the architecture 300 can include a user 302, a user interface 304, a performance execution file 306, an object storage service 308, one or more performance testing functions 310, a cloud-based computing resource 312, a database and associated data visualization and monitoring platform 314, an analysis component 316, a performance test result notification function or component 318, and a notification mode of communication 320. In various embodiments, each of the components depicted in FIG. 3 can interact with one another as indicated in FIG. 3 in an order based on the logic flow 200 as described herein.

In various embodiment, the user 302 can be a technical or a non-technical individual that wants to perform performance testing for an application. In various embodiments, the user interface 304 can be provided through a web portal (e.g., provided through a web portal accessible through the local computing device 102). The user interface 304 can include access control. In various embodiment, the web portal can be integrated with single sign-on (SSO) access control such that past records for past performance testing can be provided to the user 302 through the user interface 304 (e.g., for benchmark comparison). In various embodiments, the user interface 304 can receive login information for the user 302 and can authenticate the user based on the received login information to then enable testing.

In various embodiments, the user 302 can interact with the user interface 304 to specify code and/or an application to test. In various embodiments, the user 302 can specify a file path or API link to designate code and/or an application to test. In various embodiments, the user 302 can specify parameters for testing—e.g., number of tests, number of simultaneous users to simulate, a duration of the tests, etc. In various embodiments, the performance execution file 306 can be generated based on the specified code to test and specified parameters to test. The performance execution file 306 can include, for example, details of the API and parameters for the performance testing.

In various embodiments, the performance execution file 306 can be stored on the object storage service 308. In various embodiments, the object storage service 308 can be the Amazon Simple Storage Service (Amazon S3).

In various embodiments, the performance testing functions 310 can be generated based on the performance execution file 306. In various embodiments, the performance testing functions 310 can be code run on a serverless computing service that runs code in response to events and automatically manages underlying computing resources. In various embodiments, the performance testing functions 310 can be code executed by an event-driven, serverless computing platform provided through a cloud-based service. In various embodiments, the performance testing functions 310 can be code executed on the Amazon Web Service (AWS) Lambda (e.g., AWS Lambda functions).

In various embodiments, the operating environment 100 and/or the cloud platform 106 may be cloud service platform agnostic—for example, any cloud computing resource may be used to provide the functionalities herein. In various embodiments, the cloud computing resources may be scalable. Further, in various embodiments, the cloud resources may be AWS and/or an Amazon cloud computing resource.

In various embodiments, the performance testing functions 310 can be run against the application to be tested. In various, the performance testing functions 310 can be run on the cloud-based computing resource 312 that can be or can be associated with the Amazon Elastic Compute Cloud (Amazon EC2) and/or the Amazon Elastic Container Service (Amazon ECS). In various embodiments, the cloud-based computing resource 312 can provide a scalable computing capacity. In various embodiments, the cloud-based computing resource 312 is previously specified by the user 302 (e.g., through interaction with the user interface 304). In various embodiments, the application can be part of a Continuous Integration/Continuous Deployment (CI/CD) pipeline and details on the cloud-based computing resource 312 may not need to be provided.

As the performance testing functions 310 are being run, resulting data can be stored with the object storage service 308. Additionally, the resulting data from execution of the performance testing functions 310 can also be provided to the database and associated data visualization and monitoring platform 314. The database and associated data visualization and monitoring platform 314 can represent an implementation of the display 108 or portion thereof that can be provided to a user. The database and associated data visualization and monitoring platform 314 can present the results of the performance testing in real-time end and can provide the user 302 an opportunity to adjust the performance testing based on the results in real-time as well. In various embodiments, the database and associated data visualization and monitoring platform 314 can be and/or can include Grafana and/or InfluxDB. As an example, results of the performance testing can be streamed to InfluxDB and can be presented to the user 302 by a Grafana Dashboard.

In various embodiments, the analysis component 316 can include one or more tools or components for reviewing any results of the performance testing. In various embodiments, the analysis component can include one or more machine learning components or algorithms. Any analysis conducted by the analysis component 316 can be stored with the object storage service 308. In various embodiments, the object storage service 308 can store any information related to configuration of the performance testing, any prior testing for use in benchmark comparison analysis, and any results from the analysis component 316. In various embodiments, the analysis component 316 can analyze the results in real-time for anomaly detection. In doing so, the architecture enables the user 302 an opportunity to adjust the testing while it is being performed such that testing can be adjusted (if necessary) without having to wait until the full requested testing is completed.

In various embodiments, the performance test result notification function 318 can be implemented once all performance testing is completed. The performance test result notification function 318 can trigger a notification to the user 302 or any other individual involved or associated with the performance testing. In various embodiments, the user or other individual can be made aware of the conclusion of testing by the notification mode of communication 320. In various embodiments, the notification mode of communication 320 can be an email transmitted to the user 302 or other associated individual.

In various embodiment, the performance test result notification function 318 can be an AWS Lambda function. In various embodiments, the performance test result notification function 318 can compare any test results stored in the object storage service 308 to benchmark results and can prepare any summary (e.g., textual data regarding the test results) and any graph (e.g., graphical data regarding the test results) for the user 302 (e.g., for display on the user interface 304).

In various embodiments, any results or presentation of results can be provided by the display 108. In various embodiments, the display 108 can include test result information such as pass/fail indicators, number of requests, number of passed/failed requests, response time, average response time, transactions per second, average transactions per second, etc. The results can be stored and downloaded as well.

In various embodiments, a type of testing that can be performed can be determining how well the AUT handles simultaneous logons. For example, the performance testing can simulate simultaneous logins to an application by a large number of users, with the results indicating how many transactions per second can be handled properly.

The serverless performance testing of applications as described herein can provide a complete cloud-based performance testing solution. The serverless performance testing of applications as described provides a cost effective and generic solution that can be integrated with a CI/CD pipeline. Additionally, the serverless performance testing of applications can be provided in a self-service format that is user-friendly and can be used by non-technical individuals who want to test code/applications.

FIG. 4 illustrates a storage medium 400. Storage medium 400 may represent an implementation of a storage device of any computing device that may operate within the operating environment 100 of FIG. 1 or the architecture 300 of FIG. 3. The storage medium 400 can comprise any non-transitory computer-readable storage medium or machine-readable storage medium. In various embodiments, the storage medium 400 can comprise a physical article of manufacture. In various embodiments, storage medium 400 can store computer-executable instructions, such as computer-executable instructions to implement one or more of logic flows or operations described herein, such as the logic flow 200 of FIG. 2. In various embodiments, storage medium 400 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 5:
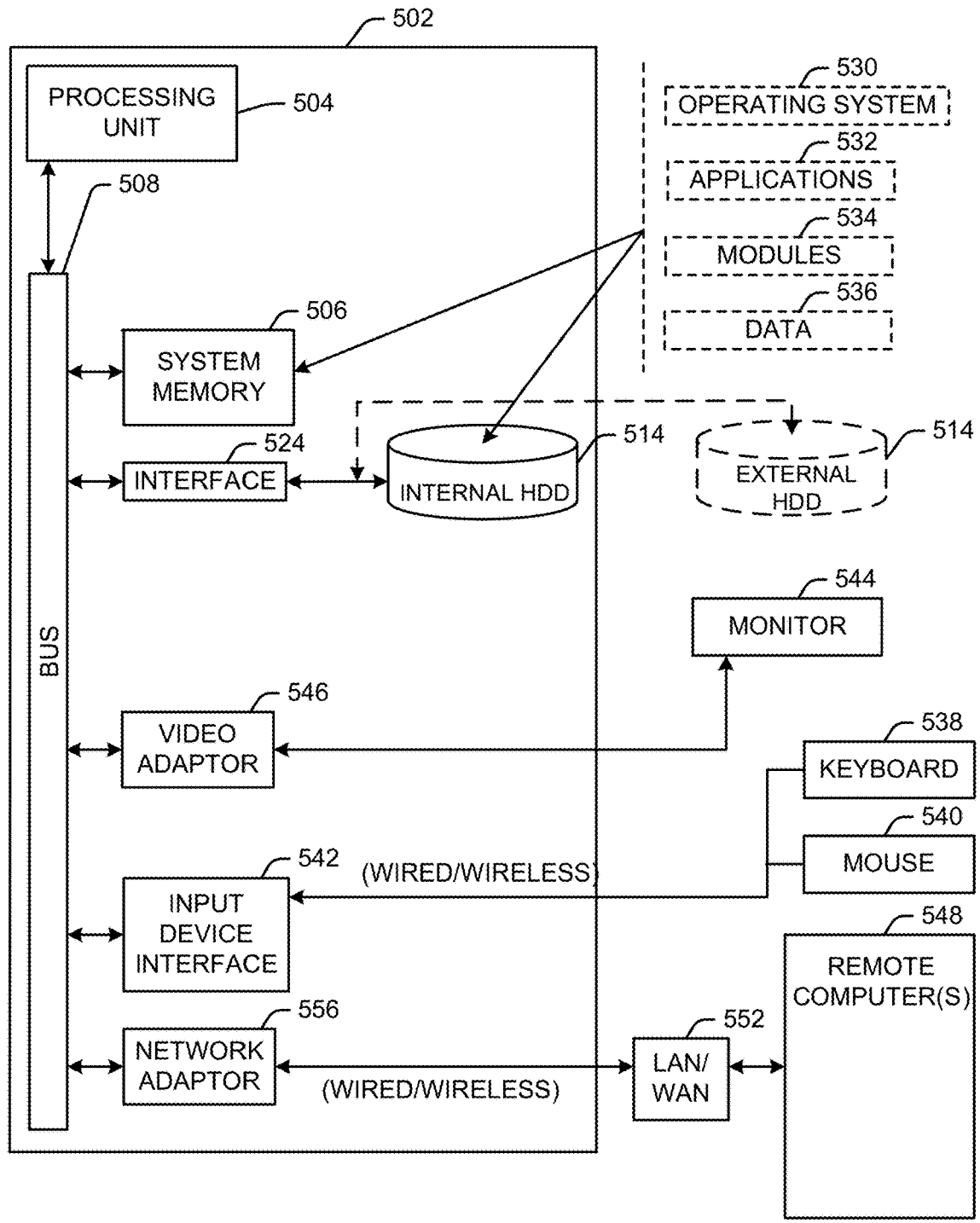
FIG. 5 illustrates a computing architecture.

FIG. 5 illustrates a computing architecture 500 that can implement various embodiments described herein. In various embodiments, the computing architecture 500 can comprise or be implemented as part of an electronic device and/or a computing device. In various embodiments, the computing architecture 500 can represent an implementation of any constituent component of the operating environment 100 depicted in FIG. 1 or the architecture 300 of FIG. 3. One or more of the constituent components of the computing architecture 500, and/or any constituent component of the operating environment 100 or the architecture 300 can be implemented in hardware, software, or any combination thereof including implementation based on a storage device (e.g., a memory unit) and logic, at least a portion of which is implemented in circuitry and coupled to the storage device. The logic can be or can include a processor or controller component such as, for example, a processor or controller that executes code stored in the storage device.

The computing architecture 500 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 5, the computing architecture 500 can comprise a computer 502 having a processing unit 504, a system memory 506 and a system bus 508. The processing unit 504 can be any of various commercially available processors or can be a specially designed processor.

The system bus 508 provides an interface for system components including, but not limited to, an interface between the system memory 506 and the processing unit 504. The system bus 508 can be any of several types of bus structure that may further interconnect to a memory bus (with or without a memory controller), a peripheral bus, and a local bus using any of a variety of commercially available bus architectures.

The system memory 506 can include any type of computer-readable storage media including any type of volatile and non-volatile memory. The computer 502 can include any type of computer-readable storage media including an internal (or external) hard disk drive (HDD) 514. In various embodiments, the computer 502 can include any other type of disk drive such as, for example, a magnetic floppy disk and/or an optical disk drive. The HDD 514 can be connected to the system bus 508 by a HDD interface 524.

In various embodiments, any number of program modules can be stored in the drives and memory units 506 and/or 514 such as, for example, an operating system 530, one or more application programs 532, other program modules 534, and program data 536.

A user can enter commands and information into the computer 502 through one or more wired/wireless input devices such as for example, a keyboard 538 and a pointing device, such as a mouse 540. These and other input devices can be connected to the processing unit 504 through an input device interface 542 that is coupled to the system bus 508. A monitor 544 or other type of display device can also be connected to the system bus 508 via an interface, such as a video adaptor 546. The monitor 544 may be internal or external to the computer 502.

The computer 502 may operate in a networked environment using logical connections via wired and/or wireless communications to one or more remote computers, such as a remote computer 548. The remote computer 548 can be a workstation, a server computer, a router, a personal computer, portable computer, microprocessor-based entertainment appliance, a smartphone, a tablet, a peer device or other common network node, and typically includes many or all of the elements described relative to the computer 502. The logical connections depicted include wired and/or wireless connectivity to networks 552 such as, for example, a local area network (LAN) and/or larger networks, for example, a wide area network (WAN). Networks 552 can provide connectivity to a global communications network such as, for example, the Internet. A network adapter 556 can facilitate wired and/or wireless communications to the networks 552. The computer 502 is operable to communicate over any known wired or wireless communication technology, standard, or protocol according to any known computer networking technology, standard, or protocol.

Figure 6:
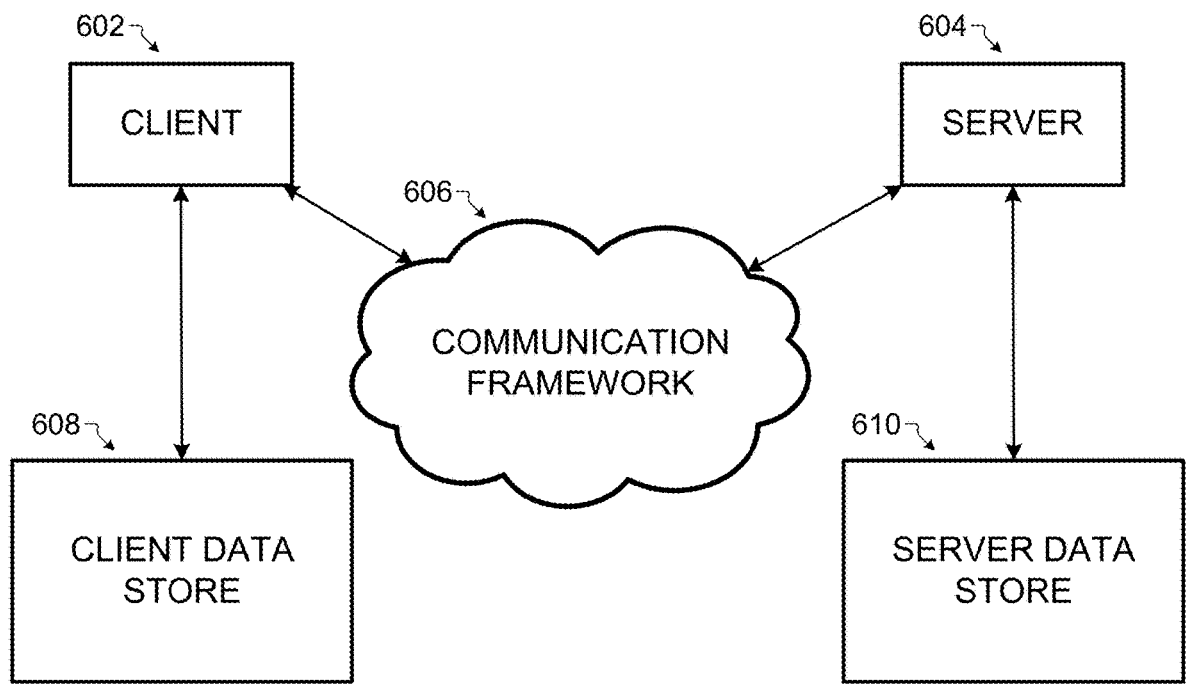
FIG. 6 illustrates a communication architecture.

FIG. 6 illustrates a block diagram of a communication architecture 600. The communication architecture 600 can implement various embodiments described herein. As shown in FIG. 6, the communication architecture 600 comprises one or more clients 602 and servers 604. One of the clients 602 and/or one of the servers 604 can represent any constituent component of the operating environment 100 depicted in FIG. 1 or the architecture 300 depicted in FIG. 3.

The client 602 and the server 604 can be operatively connected to a client data store 608 and a server data store 610, respectively, that can be employed to store information local to the respective client 602 and server 604. In various embodiments, the client 602 and/or the server 604 can implement one or more of logic flows or operations described herein. The server 604 can represent a cloud computing resource or service.

The client 602 and the server 604 can communicate data or other information between each other using a communication framework 606. The communications framework 606 can implement any known communications technique or protocol. The communications framework 606 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 606 can operate over any communication media according to any networking technology including any wired or wireless communications standard or protocol, or any combination thereof.

The following set of first examples pertain to further embodiments.

Example 1 is a computing device comprising a storage device, a display, and logic, at least a portion of the logic implemented in circuitry coupled to the storage device and the display, the logic to receive login information for a user, authenticate the user based on the received login information, receive an indication of application code to test within a serverless computing framework, the application code associated with an application server, receive one or more parameters specifying a testing of the application code, generate a performance test execution file based on the indicated application code and the one or more parameters specifying the testing of the application code, generate one or more serverless functions for implementing the testing of the application code based on the performance test execution file, execute the one or more serverless functions to implement the testing of the application code on a cloud-based computing resource, generate one or more test outputs based on execution of the one or more serverless functions, and store the one or more test outputs within a memory storage repository.

Example 2 is an extension of Example 1 or any other example disclosed herein, the indication to comprise at least one of a file path and an application program interface (API) link.

Example 3 is an extension of Example 1 or any other example disclosed herein, the one or more parameters specifying the testing of the application code to comprise a duration of the testing.

Example 4 is an extension of Example 3 or any other example disclosed herein, the one or more parameters specifying the testing of the application code to comprise at least one of a number of simulated users and a number of test simulations.

Example 5 is an extension of Example 1 or any other example disclosed herein, the memory storage repository to comprise a repository provided through a cloud-based object storage service.

Example 6 is an extension of Example 1 or any other example disclosed herein, the one or more serverless functions to each comprise code executed by an event-driven, serverless computing platform provided through a cloud-based service.

Example 7 is an extension of Example 6 or any other example disclosed herein, the cloud-based computing resource having a scalable computing capacity.

Example 8 is an extension of Example 1 or any other example disclosed herein, the logic to stream in real-time a portion of the one or more test outputs to a dashboard visualization tool during the testing of the application code.

Example 9 is an extension of Example 8 or any other example disclosed herein, the one or more outputs to comprise at least one of an indication of response time and an indication of success or failure.

Example 10 is an extension of Example 8 or any other example disclosed herein, the logic to adjust the one or more parameters specifying the testing of the application code based on an input from the user during the testing of the application code.

Example 11 is a method performing any of the steps or functions (e.g., performed by the logic of the computing device) recited in any of the Examples 1-10.

Example 12 is at least one non-transitory computer-readable medium comprising a set of instructions that, in response to being executed on a computing device, cause the computing device to implement any of the steps of functions (e.g., performed by the logic of the computing device) recited in any of the Examples 1-10.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. A computing device, comprising:
a processor circuitry;
a storage device; and
logic, wherein at least a portion of the logic is implemented in the processor circuitry coupled to the storage device and is configured to:
receive, from a client device, login information for a user;
authenticate the user based on the received login information;
receive, from the client device, an indication of application code to be tested within a serverless computing framework, wherein the application code is associated with an application server;
receive, from the client device, one or more parameters for testing of the application code, wherein the one or more parameters comprise a number of simulated users for the testing of the application code, a duration of the testing of the application code, a type of the testing of the application code, and a number of test simulations for the testing of the application code;
generate a performance test execution file based on the application code and the one or more parameters specifying the testing of the application code;
determine and assign one or more serverless functions for implementing the testing of the application code based on the performance test execution file;
execute the one or more serverless functions to implement the testing of the application code on a cloud-based computing resource;
receive, from the client device, an input modifying the one or more parameters during the testing of the application code;
execute the one or more serverless functions to complete the testing of the application code on the cloud-based computing resource according to the modified one or more parameters;
generate one or more test outputs based on the execution of the one or more serverless functions to complete the testing of the application code;
store the one or more test outputs within a memory storage repository; and
stream, in real-time, a portion of the one or more test outputs to a dashboard visualization tool subsequent to executing the one or more serverless functions to complete the testing of the application code.

2. The computing device of claim 1, wherein the received indication of the application code to be tested within the serverless computing framework comprises at least one of a file path and an application program interface (API) link.

3. The computing device of claim 1, wherein the performance test execution file comprises a test script.

4. The computing device of claim 1, wherein the memory storage repository comprises a repository provided through a cloud-based object storage service.

5. The computing device of claim 1, wherein each serverless function of the one or more serverless functions comprises code executed by an event-driven, serverless computing platform provided through a cloud-based service.

6. The computing device of claim 5, wherein the cloud-based computing resource has a scalable computing capacity, and wherein a Continuous Integration/Continuous Deployment (CI/CD) pipeline comprises the application code.

7. The computing device of claim 1, wherein the received indication of the application code to be tested within the serverless computing framework comprises an application program interface (API) link.

8. The computing device of claim 7, wherein the one or more test outputs comprise at least one of an indication of response time and an indication of success or failure.

9. A method, comprising:
receiving, from a client device, login information for a user;
authenticating the user based on the received login information;
receiving, from the client device, an indication of application code to be tested within a serverless computing framework, wherein the application code is associated with an application server;
receiving, from the client device, one or more parameters for testing of the application code, wherein the one or more parameters comprise a number of simulated users for the testing of the application code, a duration of the testing of the application code, a type of the testing of the application code, and a number of test simulations for the testing of the application code;
generating a performance test execution file based on the application code and the one or more parameters specifying the testing of the application code;
determining and assigning one or more serverless functions for implementing the testing of the application code based on the performance test execution file;
executing the one or more serverless functions to implement the testing of the application code on a cloud-based computing resource;
receiving, from the client device, an input modifying the one or more parameters during the testing of the application code;
executing the one or more serverless functions to complete the testing of the application code on the cloud-based computing resource according to the modified one or more parameters;
generating one or more test outputs based on the execution of the one or more serverless functions to complete the testing of the application code;
storing the one or more test outputs within a memory storage repository; and
streaming, in real-time, a portion of the one or more test outputs to a dashboard visualization tool subsequent to executing the one or more serverless functions to complete the testing of the application code.

10. The method of claim 9, wherein the received indication of the application code to be tested within the serverless computing framework comprises at least one of a file path and an application program interface (API) link.

11. The method of claim 9, wherein each serverless function of the one or more serverless functions comprises code executed by an event-driven, serverless computing platform provided through a cloud-based service.

12. At least one non-transitory computer-readable storage medium storing a set of instructions that, in response to being executed on a computing device, cause the computing device to:
receive, from a client device, login information for a user;
authenticate the user based on the received login information;
receive, from the client device, an indication of application code to be tested within a serverless computing framework, wherein the application code is associated with an application server;
receive, from the client device, one or more parameters for testing of the application code, wherein the one or more parameters comprise a number of simulated users for the testing of the application code, a duration of the testing of the application code, a type of the testing of the application code, and a number of test simulations for the testing of the application code;
generate a performance test execution file based on the application code and the one or more parameters specifying the testing of the application code;
determine and assign one or more serverless functions for implementing the testing of the application code based on the performance test execution file;
execute the one or more serverless functions to implement the testing of the application code on a cloud-based computing resource;
receive, from the client device, an input modifying the one or more parameters during the testing of the application code;
execute the one or more serverless functions to complete the testing of the application code on the cloud-based computing resource according to the modified one or more parameters;
generate one or more test outputs based on the execution of the one or more serverless functions to complete the testing of the application code;
store the one or more test outputs within a memory storage repository; and
stream, in real-time, a portion of the one or more test outputs to a dashboard visualization tool subsequent to executing the one or more serverless functions to complete the testing of the application code.

* * * * *